Patented Feb. 17, 1953

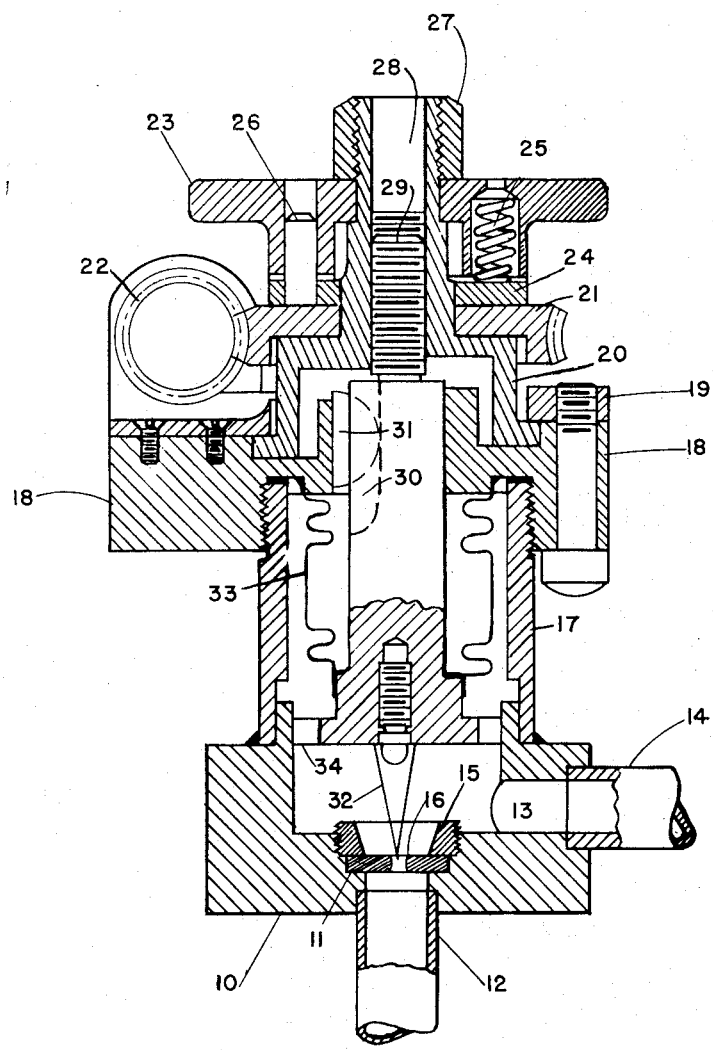

2,628,638

UNITED STATES PATENT OFFICE 2,628,638

FLOW VALVE CONTROL

Newton S. Herod, Smyrna, and Louis R. O'Neill, Fairmont, W. Va., assignors to the United States of America as represented by the United States Atomic Energy Commission Application March 1, 1946, Serial No. 651,284

3 Claims. (Cl. 137—747)

This invention relates to an improved flow control and more particularly to an improved fluid-tight valve adjustable through a plate clutch arrangement to permit fine control of fluids particularly in the nature of corrosive gases moving at a slow velocity.

Fluid-tight valves that are relatively coarsely adjustable are well known. However, in diffusion gas separators or conduits requiring uniform flow of fluids at low velocities by minute adjustment of a valve capable of withstanding corrosive action without leakage, the present day valves are unsuitable.

It is therefore an object of this invention to provide an improved sealed valve arrangement which may be minutely adjusted to control the flow of fluids.

It is another object of this invention to provide an improved control valve capable of adjustments by a frictional plate clutch arranged between a relatively coarsely adjustable and a finely adjustable operating means.

A further object of this invention is to provide an improved minutely adjustable valve resistant to the action of corrosive gases and having a novel replaceable valve seat and insert.

Further objects, advantages, modifications, substitutions and alterations will be apparent in the accompanying description of the attached drawing which is a transverse cross-sectional view of an embodiment of our invention.

Referring to the drawing, there is illustrated a brass valve base 10 in which is inserted a replaceable valve seat 11 of Monel, or other metal resistant to corrosive fluids, between the outlet passageway 12 and the enlarged chamber 13 fed by inlet passageway 14. The valve seat 11 is replaceable by removing brass screw 15 and reinserting a new valve seat which has an orifice diameter on the order of, for example, .020 inch. Other valve seats having a larger or smaller orifice may, of course, be inserted. The predominant feature comprises the curvature of surface 16 at the opening in the valve seat 11. This curvature of surface 16 as shown flares outwardly from the center of the valve seat to provide a more accurate control and smooth flow of gases in addition to preventing the accumulation of material, by corrosion or otherwise, in the valve seat. Mounted on and welded to the valve base 10 is cylindrical brass valve body 17 supporting brass valve top 18 onto which valve body 17 is threaded and tightly turned against a suitable sealing gasket as tin or the like to form a fluid seal. A brass lug 19 overlaps and retains an outwardly turned flange on an axially rotatable valve lifting and closing means 20. This valve lifting and closing means 20 is operable independently by frictionally supported gear wheel 21 associated with vernier 22 supported on valve top 18 by suitable obvious means, to permit a fine movement of the valve stem as hereinafter described. Valve lifting and closing means 20 is further operable by hand wheel 23 which permits coarse movement of the valve stem through friction clutch plate 24 frictionally supported on gear wheel 21. The friction clutch plate 24 is supported by and pressed against the gear 21 by spring 25 extending into wheel 23 which engages the clutch plate 24 through pin 26. Pin 26 extends into wheel 23 to cause the wheel 23 and clutch plate 24 to move together. The clutch plate permits the wheel to slip on the independent fine adjusting gear 21 mounted on and supported by the valve top 18. A nut member 27 locks the two independent adjusting means 21 and 23 with frictional clutch plate 24 therebetween into interfitting relationship on the axially rotatable valve lifting and closing means 20.

Supported by the lifting and closing means 20 there is in the threaded passageway 28 a valve stem 29 which is held in a non-rotatable but axially movable position by groove 30 in the valve stem 29 and key 31 on valve top 18. Situated at the opposite end of valve stem 29 is a replaceable corrosion resistant tapered nickel coated or nickel-zinc alloy valve closure member 32. This closure member or insert 32 is preferably conical and is attached to a screw member by which the closure member 32 is replaceably mounted on the valve stem 29. The point of closure member 32 is adjustable into the opening in valve seat 11 to decrease or enlarge the flow of gas therethrough in accordance with the conditions of the process or flow of fluid in conduits 12 and 14. It is indicated that the replaceable member 32 may be interchangeable with like inserts of different sizes or somewhat similar members having blunted or pointed ends of relatively variable sizes adapted to cooperate with various interchangeable valve seat members of the character of valve seat 11 in the manner as hereinafter described.

In order to prevent escapage of fluid from the system through the valve fixture, the valve stem 29 is sealed in valve casing 17 by a flexible bronze bellows 33. One end of bellows 33 is soldered to an internal flange on valve top 18 by corrosion resistant solder such as 95 percent tin and 5 percent silver. The other end of bellows 33 is similarly soldered to a flange on valve stem 29. The key 31 and groove 30, above described, prevents undue tension or torque on bellows 33 during axial movement of the member 20. Other bellows material of Monel, Phosphor bronze, one or two ply brass, or resinous material may be used if desired.

Valve stem 29 is guided in the valve casing by a ring member 34 which contacts and slides on the walls of the valve casing to form chamber 13. Fluid entrapped about the bellows 33 may escape freely between ring member 34 and the valve base without harm to the valve assembly.

In order to provide for accurate adjustment of the valve insert 32 with respect to the opening in valve seat 11 the threaded end of valve stem 29 and axially rotatable member 20 are provided with threads on the order 32 per inch. The vernier 22 and gear 21 are provided with screw threads so that one revolution of the vernier produces a movement or change of .0002604 inch between valve seat 11 and the valve stem 29. That is, in multiples of five turns of the worm the area of opening of valve seat 11 changes in multiples of .00004 square inch, the orifice diameter being on the order of .020 inch as indicated.

Accordingly the valve stem 29 carrying valve insert 32 can be coarsely adjusted $\frac{1}{32}$ inch per revolution by hand wheel 23 to a desired position with respect to valve seat 11 where accurate flow control is not of paramount importance. However, if the fluid is flowing at a low velocity as is the case in gas separation by diffusion, it is necessary to carefully control the flow of both the feed gases and the product gases at a differential pressure. It is therefore necessary to operate the vernier control to increase or decrease the valve opening and produce fine changes in the gas flow through the valve in accordance with the desired condition of the system. The frictional plate clutch 24 permits operation of the coarse control 23 without movement of the gear wheel 21 and vernier 22, whereas the frictional engagement of gear wheel 21 with axial rotatable valve lifting and closing means 20 permits fine adjustment of valve stem 29 positioning the point 32 in accordance with a desired area of the opening at valve seat 11.

In operation the hand wheel 23 permits coarse adjustment of the valve insert 32 by its mechanical engagement, under nut 27 and through clutch plate 24, with valve lifting and closing means 20, so that when turned the clutch plate 24 slides over gear wheel 21 to position the valve approximately as desired. However, where more accurate control of fluid flow is necessary and a finer adjustment in the area of the valve opening is required, the vernier 22 may be operated to turn the valve lifting and closing means through its frictional engagement with the gear wheel 21 thereby positioning the valve insert 32 from either its originally adjusted position or from an entirely opened or closed position. For extremely fine adjustment of the valve from a closed position the area of the opening can be accurately gauged by counting the number of turns of the vernier and calculating in the manner as heretofore indicated. In addition this fine adjusting means provides a safety device for protecting the valve stem and valve seat from distortion through the application of excessive torque by the sliding action of the friction clutch plate arrangement upon closure of the valve by the vernier.

In order to replace or change the valve seat 11 and/or the valve insert 32, the valve top 18 is unscrewed from the valve body 17 permitting withdrawal of valve stem 29, thereby leaving the screw member 15 exposed for removal and reinsertion. Further the valve insert member 32 obviously is exposed for replacement or examination at this time. A further disassembly of the apparatus may be accomplished by the relatively simple removal of nut 27 which frees the hand wheel 23 so that it may be lifted off together with clutch plate 24 and gear 21. Removal of lug 19 permits separation of the valve lifting and closing means 20 from valve top 18 and valve stem 29 by merely rotating the means 20.

By this arrangement we have provided a simple, efficient and practical valve with interchangeable valve seat and insert which may be assembled and disassembled in a relatively short period of time. Further we have provided for accurate control means capable of regulating low rates of flow particularly of corrosive gases in systems requiring minute regulation and adjustment. In addition means are provided for preventing undue or excessive pressure between the valve seat and its closure member.

Since many embodiments might be made of the present invention and since many changes might be made in the embodiment described, it is to be understood that the foregoing description is to be interpreted as illustrative only and not in a limiting sense.

We claim:

1. In an apparatus of the class described, a hollow valve body member, a base element rigidly affixed to a first end of said body member, an inlet conduit and an outlet conduit communicating with the interior of said body member through said base element, an apertured replaceable valve seat mounted in said base element centrally of the axis of said body member and adapted to be replaced through the second end of said body member, a valve stem mounted for reciprocable and non-rotatable movement within said body member and having a threaded extension at one end, a replaceable valve spaced from said body member and separately attached to said stem for coaction with said valve seat, a rotatable closure means removably mounted at the second end of said body member and enclosing said valve stem, said closure means having an interiorly threaded surface engaging the threaded extension of said valve stem, a flexible bellows mounted at one end upon said valve stem and at the second end upon said body member and means keying said stem to said non-rotatable body member interiorly of said bellows and adjacent the closure means thereby to relieve the bellows of stress and to prevent rotation of said valve stem and valve while preventing leakage along said valve stem.

2. In an apparatus of the class described, a hollow valve body member, a base element rigidly affixed to a first end of said body member, an inlet conduit and an outlet conduit communicating with the interior of said body member through said base element, an apertured replaceable valve seat mounted in said base element centrally of the axis of said body member and adapted to be replaced through the second end of said body member, a valve stem mounted for reciprocal and non-rotatable movement within said body member and having a threaded extension at one end, a replaceable valve spaced from said body member and separately attached to said stem for coaction with said valve seat, a rotatable closure member removably mounted at the second end of said body member and enclosing said valve stem, said closure member having an interiorly threaded surface engaging the threaded extension of said valve stem, means for rotating said closure member and including a plurality of actuating members adapted to be rotated independently of each other, a flexible bellows mounted at one end upon said valve stem and at the second end upon said body member and means keying said stem to said non-rotatable body interiorly of said bellows and adjacent the closure member thereby to relieve the bellows of stress and to prevent rotation of said valve stem and valve while preventing leakage along said valve stem.

3. Apparatus as described in claim 2 wherein said closure rotating means comprises two actuating members adapted to be rotated independently at different speeds.

NEWTON S. HEROD.
LOUIS R. O'NEILL.

REFERENCES CITED

The following references are of record in the file of this patent:

UNITED STATES PATENTS

| Number | Name | Date |
|---|---|---|
| 1,439,444 | Pendergast | Dec. 19, 1922 |
| 1,577,714 | Hayden | Mar. 23, 1926 |
| 1,698,826 | Shaffer | Jan. 15, 1929 |
| 1,802,093 | Slagel | Apr. 21, 1931 |
| 1,886,159 | Brown | Nov. 1, 1932 |
| 1,921,895 | Taurisano | Aug. 29, 1933 |
| 2,051,307 | Lorraine | Aug. 18, 1936 |